United States Patent
Gilbert

[15] 3,649,150
[45] Mar. 14, 1972

[54] STELLITE NECK FORMING PLUG FOR BLOW MOLDING ORIENTED ARTICLES

[72] Inventor: Dixie E. Gilbert, Bartlesville, Okla.
[73] Assignee: Phillips Petroleum Company
[22] Filed: Nov. 26, 1969
[21] Appl. No.: 880,326

[52] U.S. Cl. .................................. 425/297, 264/98, 264/338, 425/326, 425/378
[51] Int. Cl. .................................... B29c 17/07, B29c 1/04
[58] Field of Search ................. 18/5 BM, 5 BA, 45 R, 19 TM; 75/171; 264/93, 94, 96–99, 337–338

[56] References Cited

UNITED STATES PATENTS

| | | | |
|---|---|---|---|
| 3,507,005 | 4/1970 | Wiley et al. | 264/94 X |
| 3,127,636 | 4/1964 | Heider | 264/98 |

FOREIGN PATENTS OR APPLICATIONS

| | | | |
|---|---|---|---|
| 1,131,968 | 10/1968 | Great Britain | 264/98 |
| 697,326 | 9/1953 | Great Britain | 18/5 BA |

OTHER PUBLICATIONS

Zimmerman, O. T. and Lavine, Irvin; Handbook of Material Trade Names; (c) 1946; p. 417 relied on Haynes Stellite Publication.

Primary Examiner—Robert F. White
Assistant Examiner—J. H. Silbaugh
Attorney—Young and Quigg

[57] ABSTRACT

Jaw means for grasping an open end of a tubular parison and a Stellite neck forming plug movable axially so as to enter the parison and force the parison out into conformity with a molding zone of the jaw means. Means are provided for moving the plug and for forming and blow molding the parison. The plug has a first section of reduced diameter and a second adjacent section of larger diameter.

6 Claims, 5 Drawing Figures

Patented March 14, 1972 3,649,150

INVENTOR.
D. E. GILBERT

BY Young & Quigg

ATTORNEYS

STELLITE NECK FORMING PLUG FOR BLOW MOLDING ORIENTED ARTICLES

BACKGROUND OF THE INVENTION

This invention relates to apparatus for forming hollow articles by blow molding a thermoplastic parison at the orientation temperature of said thermoplastic.

Patents in the blow molding art go back over 100 years, however, it has only been in the last dozen years or so that this technique has achieved significant commercial success. Very recently, techniques have been developed for forming biaxially oriented hollow articles utilizing a technique wherein a parison is fabricated at orientation temperature. Such techniques are disclosed in Wiley, U.S. Pat. No. 3,288,317, and Turner et al., U.S. Pat. No. 3,390,426, for instance. The techniques disclosed in said Wiley and Turner et al. patents make possible the production of articles having very desirable properties, which properties cannot be obtained in conventional processes. However, by virtue of the fact that the parison is at orientation temperature during the fabrication process, many manipulative operations which are easily carried out on a thoroughly molten parison present special problems utilizing this technique.

One particularly difficult problem is getting a good finish on the neck and/or thread area. A tapered plug can be inserted into the interior of the parison to force it out into conformity with thread-forming jaws. However, because the parison is at orientation temperature, which is well below the point at which it is molten, a substantial amount of force is required to accomplish this. It has been found that with plugs made of metal, such as steel, the parison is pushed out of the molding jaws, rather than being expanded into conformity with the thread-forming zone. Various plastic materials known to have good high temperature properties and low coefficient of friction have been tried, but they tend to wear out and/or develop a build-up of deposits which causes sticking.

SUMMARY OF THE INVENTION

It is an object of this invention to provide an improved apparatus for forming biaxially oriented hollow articles; and It is a further object of this invention to provide apparatus for forming bottles and the like having the advantage of high strength imparted by orientation without any sacrifice in the quality of the detail in the neck and thread area.

In accordance with this invention, one end of a thermoplastic parison at orientation temperature is expanded out into conformity with a neck forming zone by means of the insertion of a plug, at least the surface of which is made of Stellite.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
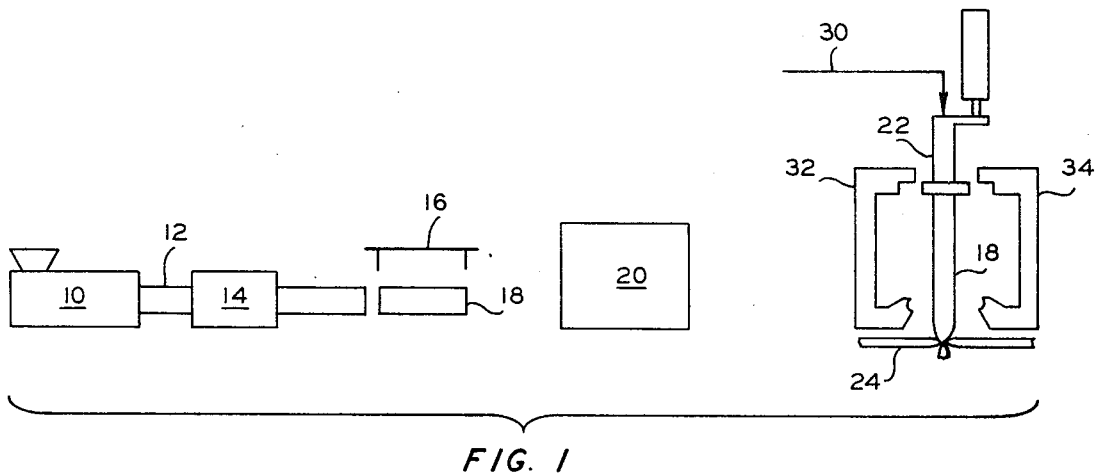
FIG. 1 is a schematic representation of a molding operation adapted to utilize the instant invention.

This invention is applicable to the formation of any biaxially oriented article having a neck and/or thread area which requires reasonably precise detail.

The invention is applicable for the production of these articles from any orientable thermoplastic resin. Exemplary resins are polyolefins, poly(vinyl chloride), acrylonitrile-butadiene-styrene polymers, styrene-butadiene containing copolymers, vinylidene chloride polymers and copolymers, polyamide, polystyrene, and the like. Preferred resins include crystalline polymers such as polymers of at least one mono-1-olefin having two to eight carbon atoms per molecule, more preferably polymers and copolymers of ethylene, propylene, and 1-butene, with polypropylene being especially preferred.

The thermoplastic is first extruded or molded into parison preforms and cooled to solidify same. The parisons are then heated to orientation temperature, which in the case of olefin polymers, is generally about 1–50, preferably 5°–25° F., below the crystalline melting temperature. The crystalline melting temperature can be determined by placing a small sample of the material to be tested on a heating stage of a polarizing microscope and recording the crystalline melting point as that temperature at which the last birefringence disappears on slow heating. The parison preforms can be heated to this orientation temperature in an air oven, in a liquid bath, in a heating block, or by subjecting them to radiant heat or any other suitable means.

While the stretching, insertion of the plug, and expansion into conformity with the mold is generally carried out at ambient temperature, the sequence of steps is sufficiently rapid that the polymer remains at orientation temperature throughout the operation.

At least the surface of the portion of the plug contacting the parison must be made of an alloy having a composition comprising the following: 40–80 percent cobalt; 20–35 percent chromium; 0.75–2.5 percent carbon; 0–25 percent tungsten; 0–5 percent nickel; 0–5 percent iron; 0–3 percent manganese; 0–3 percent silicon; and 0–2 percent molybdenum, all percentages being based on weight. Such materials are available from Haynes Stellite Company under the trade name Stellite. The plug can either be solid Stellite or Stellite-coated steel or the like.

The plug must have an initial reduced diameter section to enable it to be inserted into the end of the parison.

The portion of the plug contacting the parison is preferably machined to give a surface smoothness of 1 to 125 microinches, root mean square (r.m.s.), preferably 3 to 10 r.m.s. Thereafter, generally annular serrations are formed around this portion of the plug. These generally annular serrations can either be in the form of a series of unconnected grooves or they can be in the form of threads. Threads are preferred because of the greater simplicity in the machining operations. Preferably, the threads have a depth of 1–4 mils, more preferably 1–2 mils, and a lead of 2–15, preferably 6–12 mils.

Surprisingly, it has also been found that the shrinkage of the material in the thread and/or neck area can be reduced by utilizing a plug having means to cool the interior thereof. Also, cooling the plug allows maintaining a constant temperature; this precludes sticking on insertion of the plug with resultant deformation of the neck finish area.

Figure 3:
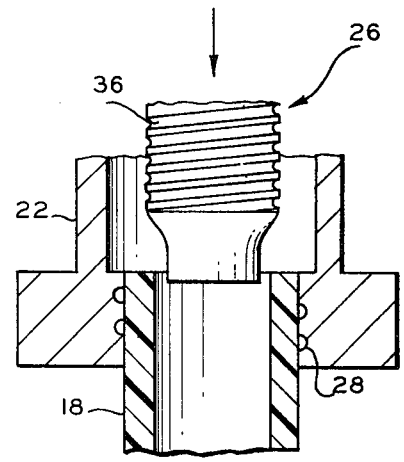
FIG. 3 is a detailed view showing the relationship of the plug to the gripping jaws.

Referring now to the FIGURES, there is shown in FIG. 1 an extrusion means 10 for forming a tubular extrudate 12. The tubular extrudate passes through vacuum cooling and sizing chamber 14 and thence to cutter 16 where it is severed into individual parison preforms 18. Parison preforms 18 pass through air oven 20 where they are heated to orientation temperature. Thereafter, the parison preforms 18 are transferred by means not shown to thread forming jaws 22. They are grasped at the other end by gripping fingers 24 and stretched axially by means of relative movement between thread forming jaws 22 and gripping fingers 24. Either before, during, or after the stretching operation, plug 26 (See FIG. 3) descends to force the upper end of parison 18 out into conformity with thread forming contours 28 of jaws 22. The plug is attached to a mechanism (not shown) within jaws 22 by means of the threaded section shown at the top end of each plug; this mechanism causes axial movement of the plug to effect insertion of the plug into the end of the parison. Thereafter, fluid pressure is introduced via line 30 to expand said parison out into conformity with the molding zone formed by mold halves 32 and 34. Plug 26 has spiral threads 36 in the portion which contacts parison 18.

Figure 2:
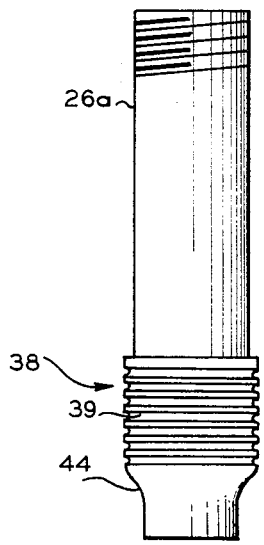
FIG. 2 is a side elevation of a Stellite plug in accordance with the instant invention.

Referring to FIG. 2, there is shown a plug 26a identical to plug 26 except that in place of threads, cylindrical section 38 has a series of annular serrations 39. In all FIGURES, the size of the serrations are exaggerated, since, as noted above, the actual depth is only about 1–4 mils.

Figure 4:
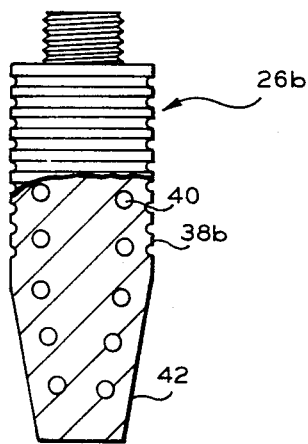
FIG. 4 is a sectional view of a plug in accordance with an alternative embodiment of the invention.

Referring now to FIG. 4, there is shown an alternative embodiment of the invention wherein plug 26b has channels 40 for the circulation of cooling fluid therethrough. Annular serrations 38b are again shown in slightly exaggerated form. It is noted that in this plug, the portion 42 which is first inserted into the parison comprises a simple taper whereas in the embodiment shown in FIG. 2, for instance, the leading section is a cylinder connected with cylindrical section 38 by means of a shoulder 44. The section of the plug which comes into contact with the parison such as section 38b of FIG. 4 can either by cylindrical so as to give an interior finish to the neck of the bottle which is of the same diameter from top to bottom to thus facilitate the use in conventional filling machinery, or it can have a slight taper. In the instances where it is tapered, it will generally have a taper in the order of 2–10, preferably about 5 mils per inch.

Figure 5:
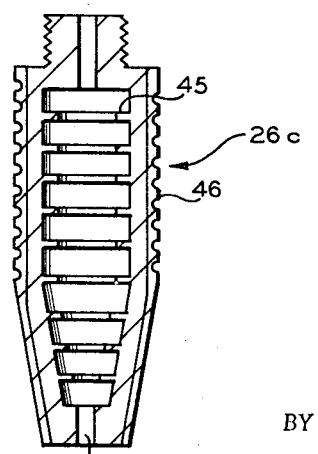
FIG. 5 is a sectional view of a plug in accordance with another alternative embodiment of the invention.

Referring now to FIG. 5, there is shown another alternative embodiment of the invention wherein plug 26c has cooling fins 45. In this embodiment, the major portion of the plug is formed from steel with a coat 46 of Stellite on the outer surface thereof. Fluid to expand the parison from line 30 enters the interior of the parison through orifice 48 in plug 26c.

Many conventional parts have been omitted, such as temperature controllers, frame elements, motors, and the like, but their inclusion is understood by those skilled in the art and is within the scope of the invention.

EXAMPLE I

Propylene homopolymer having a density of 0.905 (ASTM D 1505-63T), a melt index of 2 (ASTM D 1238-62T, Condition L), and a crystalline melting pint of about 340° F. was extruded into tubing having an outside diameter of about 0.85 inch and a wall thickness of about 0.15 inch. This tubing was cooled to room temperature, cut into 5-inch lengths, and reheated to about 320° F. Such heated parison was then grasped at a lower end thereof by pinching fingers such as those shown in the drawings, and at the other end thereof by thread forming jaws such as those shown in the drawings. It was then stretched to about 200 percent of its original length and a plug having the configuration shown in FIG. 3 made of Stellite-coated steel was moved axially into the open end of the parison to expand same out into conformity with the thread-forming means of the jaws. The alloy used in the plug was Stellite 6B which comprised 47.1 percent cobalt, 30 percent chromium, 4.5 percent tungsten, 3 percent nickel, 3 percent iron, 2 percent manganese, 1.5 percent molybdenum, 1.1 percent carbon, and 2 percent silicon. The initial cylindrical section had an outer diameter of 0.490 inch and the main cylindrical section had an outer diameter of 0.600 inch. The inner diameter was 0.474 inch. The 0.600-diameter section of the plug had the surface finished to a 4-microinch, r.m.s. polish and thereafter, 8.8 lead threads having a depth of 1 ½ mils were made, using a round-nosed tool. The first cylindrical section, including the shoulder area, was three-eighths of an inch long, with the second cylindrical section being seven-eighths of an inch long. Thereafter, internal fluid pressure was introduced into the parison to expand same out into conformity with the mold walls to produce a bottle having excellent tolerance in the thread area. This operation was carried out on a cyclic basis producing a plurality of bottles without any difficulty from sticking or forcing the parison loose from the jaws on insertion of the plug.

EXAMPLE II

A Stellite plug identical to that of example I except without the threads in the contact area was utilized. This plug performed satisfactorily under moderate conditions of speed, but tended to be less satisfactory than the grooved plug when operated at a high rate of speed of insertion of the plug into the parison.

CONTROL

Identical plugs were made from (1) carbon steel, (2) stainless steel, and (3) beryllium copper alloy. All of these had an identical configuration to those of example I, including the 8.8 lead, 1 ½ mil deep threads. The plugs were used in the identical apparatus of examples I and II and under identical process conditions with identical parisons. None of these plugs worked satisfactorily under any conditions. They pushed the parison out of the thread-forming jaws and/or caused the end of the parison to curl over and be pushed down into the interior thereof. This difficulty was experienced under both the high and low insertion rates utilized in example II.

CONTROL II

An identical plug to that of example I was made using chromium-plated steel. The conditions were identical to that of example I except that the surface did not have the threads. This plug also failed to operate satisfactorily under any conditions for the same reason as in control I.

CONTROL III

An identical plug was made from three samples of polyphenylene sulfide, one filled with aluminum, one filled with asbestos, and one filled with Teflon. These plugs were identical in construction to those of example I, including the presence of the threads. They were utilized in an identical molding operation and failed to perform satisfactorily. In the case of the polyphenylene sulfide plugs, the failure was due to a build-up on the plug which caused it to stick and break in the parison.

These data show that, surprisingly, the Stellite plug performs in a satisfactory manner, where other metal plugs and low coefficient of friction plastic plugs are inoperable. The data further show, surprisingly, that the presence of grooves in the contact area allows operation at a higher rate of speed.

While this invention has been described in detail for the purpose of illustration, it is not to be construed as limited thereby, but is intended to cover all changes and modifications within the spirit and scope thereof.

I claim:

1. Apparatus comprising in combination:
   jaw means adapted to grasp an open end of a tubular parison;
   a plug having a first section of reduced diameter and a second section adjacent to said first section having a larger diameter, said second section having a surface finish within the range of 1 to 125 microinches, root mean square, over which is superimposed generally annular serrations having a depth of 1–4 mils, at least the surface of said plug being made of an alloy comprising 40–80 percent cobalt, 20–35 percent chromium, 0.75–2.5 percent carbon, 0–25 percent tungsten, 0–5 percent nickel, 0–5 percent iron, 0–3 percent manganese, 0–'percent silicon, and 0–2 percent molybdenum, said plug being coaxially disposed relative to said jaw means; and
   means to move said plug axially so as to enter said tubular parison and force same out into conformity with a molding zone of said jaw means.

2. Apparatus according to claim 1 wherein said first and second sections are connected by a gradually sloping shoulder section.

3. Apparatus according to claim 2 wherein said serrations are in the form of threads having a lead of 2–15 mils.

4. Apparatus according to claim 3 wherein said finish is within the range of 3–10 microinches, root mean square.

5. Apparatus according to claim 1 comprising in addition: means to extrude a continuous length of tubing; means to cool said tubing; means to cut said tubing into said work pieces; means to reheat said parisons; means to stretch said parisons longitudinally; mold means; and means to introduce fluid pressure into said parison so as to expand same into conformity with said mold means.

6. Apparatus according to claim 1 comprising in addition: means to cool said plug.

* * * * *

UNITED STATES PATENT OFFICE

CERTIFICATE OF CORRECTION

Patent No. 3,649,150   Dixie E. Gilbert   Dated: March 14, 1972

It is certified that error appears in the above-identified patent and that sa: Letters Patent are hereby corrected as shown below:

Column 4, line 65, claim 1, delete "0-'" and substitute therefor --- 0-3 --- column 5, line 6, claim 5, delete "work pieces" and insert therefor --- parisons - column 6, line 2, claim 5 "parison" should be --- parisons ---.

Signed and sealed this 15th day of August 1972.

(SEAL)
Attest:

EDWARD M. FLETCHER, JR,      ROBERT GOTTSCHALK
Attesting Officer         Commissioner of Patents